June 2, 1936.  W. M. STRATFORD  2,043,016
TREATING HYDROCARBON OILS
Filed Oct. 23, 1925
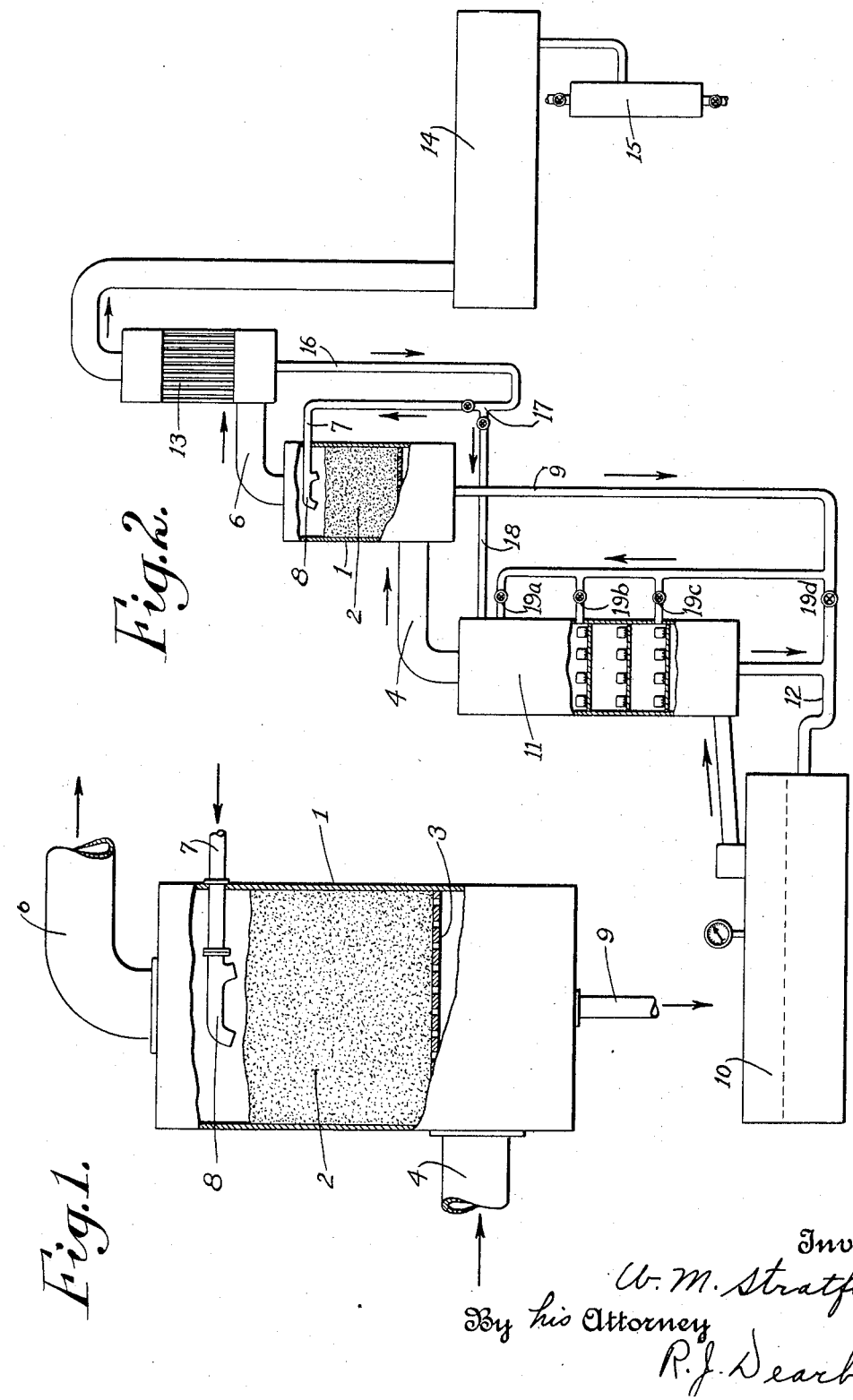
Inventor
W. M. Stratford
By his Attorney
R. J. Dearborn.

Patented June 2, 1936

2,043,016

UNITED STATES PATENT OFFICE 2,043,016

TREATING HYDROCARBON OILS

William M. Stratford, Port Arthur, Tex., assignor, by mesne assignments, to The Texas Company, New York, N. Y., a corporation of Delaware Application October 23, 1925, Serial No. 64,308

3 Claims. (Cl. 196—96)

This invention relates to the treatment of hydrocarbon oils and more particularly to the treatment of volatile hydrocarbon oils such as cracked naphthas and the like which may contain unstable unsaturated compounds.

An important object of the invention is to treat hydrocarbon oil vapors containing unsaturated compounds with a solid adsorbent catalytic material to effect polymerization of a portion thereof and to continuously maintain the catalyst in an active state.

Another object of the invention is to treat hydrocarbon oil vapors containing unsaturated compounds with a solid adsorbent catalytic material to effect polymerization of a portion of the unsaturated compounds under controlled conditions whereby a desired degree of polymerization is effected.

The invention broadly contemplates a process of treating hydrocarbon oils for the separation of unstable unsaturated constituents which includes passing the oil in vapor form in contact with a solid adsorbent catalytic material capable of effecting polymerization of the more unstable unsaturated constituents to compounds of higher boiling point; it also contemplates the removal of the relatively non-volatile polymers from the active surface of the catalyst and coincident with their formation by subjecting the catalyst to the washing and extracting action of a liquid solvent of the polymers, in order to maintain the catalyst in an active state.

The invention also embraces the provision of an apparatus adapted for carrying on the treating process.

One of the most important factors in the refining of volatile hydrocarbons, and especially the products of the cracking or decomposition of hydrocarbon oils, is the removal of undesirable unsaturated compounds. While certain oils may contain a large proportion of unsaturated compounds all of these are not necessarily undesirable. However, there is usually present a small portion of the more highly unsaturated products which, if allowed to remain in the oil, will in time polymerize to form gummy deposits and colored products and this invention is particularly directed toward the removal of such compounds from hydrocarbon oil without appreciable loss of other unsaturated products whose presence is not objectionable.

The tendency of unsaturated hydrocarbons to polymerize is greatly accelerated by contacting in the liquid phase with a solid adsorbent catalyst such as fuller's earth or activated charcoal or the like. The polymerizing action of such catalysts is even more pronounced when contacted with the vapors of unsaturated hydrocarbon compounds. In either case the polymers formed are relatively viscous, non-volatile compounds which are strongly adsorbed upon the active surface of the catalytic material.

The application of a contact catalyst of the type of fuller's earth to the refining of volatile hydrocarbon oils containing undesirable unsaturated compounds presents several difficulties. In the first place, the tendency is for the catalyst to adsorb the polymerized products as soon as they are formed and as a result the active surface of the catalyst is so poisoned and its activity so reduced as to require regeneration by burning or the substitution of new catalyst after a relatively small quantity of oil has been treated, which of course greatly increases the expense of treating the oil due to the cost of handling, recovering and replacing the catalytic material. In order to avoid too frequent handling of the catalyst and shut-downs of apparatus a very large bulk of catalyst, several tons for example, may be used but this brings out another important difficulty. Although the undesirable and very highly unsaturated compounds are more readily polymerized than are the unsaturated compounds which are neither harmful nor undesirable, the passage of oil vapors containing both types of compounds through a very large bulk of catalyst results in an over exposure to the polymerizing action and the polymerization and resultant loss of harmless unsaturated compounds which it was not desired to remove from the vapors. Thus it is clearly seen that the use of large bodies of catalytic material to avoid frequent replacement is objectionable in that the vapors are subjected to excessive catalytic activity up to the time when the entire body of catalyst becomes practically spent. In addition such procedure is only a makeshift as the catalyst must still be frequently regenerated or replaced and would not adapt the process to continuous operation.

By the practice of my invention, as is hereinafter more fully set forth and described, it is possible to contact hydrocarbon oil vapors with a solid adsorbent catalyst to effect a regulated and controlled degree of polymerization and separation of undesirable unsaturated compounds from the oil without loss of the harmless and desirable unsaturated compounds. At the same time, the catalyst is maintained in a state of effective activity, avoiding frequent replacement of material and enabling the process to be carried on as a practically continuous operation.

I have discovered that the contact catalyst which is used in the polymerization of unsaturated constituents of hydrocarbon oil vapors may be maintained in an active condition by subjecting the catalyst to the washing action of a solvent of the polymers formed during the treatment of the oil vapors. I have further discovered that the polymerizing action of contact catalytic materials upon unsaturated hydrocarbons in the vapor state is increased as the temperature of the reaction increases, so long as decomposition or cracking temperatures are not reached, and also that the tendency of the catalyst to adsorb the heavy non-volatile polymers is decreased with elevated temperatures. Therefor, by the practice of my invention I am enabled to polymerize and remove unsaturated hydrocarbons from hydrocarbon oil vapors by contacting the vapors with a catalyst, controlling the degree of polymerization by maintaining the catalyst at a substantially constant degree of activity and by varying the temperature and the time of contact between the catalyst and the oil vapors. Due to the maintenance of the catalyst in an active state, frequent replacement and handling of the catalyst is avoided.

In its application to the purification of hydrocarbon oils and particularly to the refining of petroleum distillates, the invention is susceptible of numerous variations. For example, various contact catalysts such as fuller's earth, charcoal, mineral gels or the like are available for use in effecting polymerization but due to the fact that the catalyst is maintained in a state of activity, frequent replacement is unnecessary and therefore more expensive artificially prepared catalysts of great activity may be used without materially increasing the ultimate cost of the process. The solvent used in washing and maintaining the catalysts in an active state during the process of purification may consist of a portion of the condensed vapor which has been previously purified by contact with the catalyst or it may consist of any suitable material from an extraneous source, such for example as a relatively non-volatile hydrocarbon or related compound. The process may be carried out under varying degrees of temperature and time of contact between the vapors and the catalyst, as has been mentioned before, and the pressures used may range from below atmospheric to the highest pressures within the capacity of the apparatus. However, in directly applying the invention to the treating of cracked distillates from pressure stills, it will be found advantageous to carry on the process under a superatmospheric pressure as by this means a higher temperature may be maintained in the body of the catalyst while at the same time the solvent is maintained in a substantially liquid state. In addition, an increased pressure effects greater concentration of the vapors at the catalyst surface and thereby promotes polymerization of the unsaturated compounds.

Although any combination of the above variable conditions such as activity of the catalyst, temperature, pressure, and the nature of the solvents, may be used, depending upon the characteristics of the oil to be refined, in order that the invention may be more fully understood I shall proceed to describe a simple and preferred application thereof.

The treatment or purification is preferably carried out directly in connection with a cracking still as a source of vaporized hydrocarbon oil containing objectionable and unstable unsaturated compounds. For example, a cracking still which is operated under a superatmospheric pressure and which is fitted with a fractionating tower is connected by means of vapor lines with a container in which is placed a bed of active absorbent material such as fuller's earth, activated charcoal or the like. A reflux condenser is arranged to supply reflux to the fractionating column and also to the contact material, as will be more fully discussed hereinafter. During operation of the cracking still, which is preferably continuous, hydrocarbon vapors of practically uniform composition are evolved; the vapors are passed through the fractionating tower and from this point are led into the vessel containing the contact material. The contact material will be supported upon a screen of wire cloth or the like to afford free passage of the vapors through and in contact with the adsorbent material, and the depth of the bed will vary with the particular type of adsorbent material used and also with the degree of unsaturation of the vapors, which may fluctuate with the variations in the operating conditions of the cracking still.

The vessel containing the contact material will preferably be heavily insulated and will receive a portion of the reflux liquid which is supplied to the fractionating tower from the reflux condenser. An alternative arrangement consists in omitting the insulation on the catalyst container in order that heat will be radiated therefrom sufficient to cause condensation of a portion of the vapors in contact with the catalyst. Thus the fractionated vapors are passing in contact with the catalyst, while a portion of the condensate or reflux is continuously washing out and dissolving the polymers therefrom as fast as they are formed. The solution of polymers washed out of the contact material may be returned to the fractionating column or to the still for separation of the colored non-volatile material from the solvent. The vapors issuing from the treating chamber or vessel are substantially free from objectionable, gum-forming unsaturated hydrocarbons. The catalyst chamber may be placed between the still and the fractionating column in which case the total vapors issuing from the still are subjected to the purifying treatment. However, in most cases it will be found preferable to fractionate the vapors before subjecting them to contact with the catalyst.

Although in the example described above, the solvent used in washing the catalyst consists of the condensed purified hydrocarbon vapors, other suitable solvents may be used for this purpose and it is not intended that this invention should be limited to the use of any one solvent material for this purpose. In addition, under certain conditions it may be desirable to supply the solvent to the catalyst at intervals instead of continuously, or as a modification of this procedure, to supply a relatively small quantity of the solvent to the catalyst continuously and to increase the rate of flow of the solvent at intervals to provide for the more thorough removal of the adsorbed polymers.

In the accompanying drawing is shown, more or less diagrammatically, apparatus within the invention and suitable for carrying on the desired process. In this drawing:

Figure 1 is an elevation partly in central vertical section of a catalyst container, including the necessary connections.

Figure 2 is a view partly in central vertical section and partly in elevation illustrating a specific application of the apparatus shown in Figure 1, including a cracking still, fractionating tower, reflux condenser, etc.

Referring to Figure 1, element 1 is a vessel or container for the body of catalytic material 2 which rests on the perforated plate 3, allowing a free flow of vapors through the container in contact with the catalyst. Unpurified vapors from any suitable source, for example a still, enter the chamber through the connection at 4 and pass upward through the catalyst 2 during which passage the more highly unsaturated constituents of the vapors are polymerized to compounds of higher boiling point, the bulk of which condense upon the surface of the catalyst, while the purified vapors pass on through the connection 6 to a condenser (not shown). A solvent of the polymers formed, which are condensed upon the catalyst, is introduced through the pipe 7 and the spray 8, and is distributed thereby over the bed of catalytic material through which it flows, washing the heavy polymers from the surface of the catalyst and maintaining it in an active condition. The solution of the polymerized hydrocarbons collects in the lower portion of the container 1 and is withdrawn continuously through the connection 9 and may be returned to the still or treated separately for the recovery of the solvent and of the polymers which, due to their chemical and physical properties, may be of value in the manufacture of synthetic chemicals and the like.

In Figure 2, which illustrates an application of the apparatus shown in Figure 1, 10 represents a still for cracking hydrocarbon oil at elevated temperatures and pressures, said still being fitted with a suitable fractionating tower 11, fitted with a connection 12 for returning condensate to the still. The still 10 may be supplied with suitable connections (not shown) for supplying fresh oil and withdrawing residual oil in order that the distillation may be carried on continuously. The vapors from the fractionating tower 11 enter the catalyst container 1 through the vapor line 4 and pass upwards through the catalytic material 2 where purification of the vapors and polymerization of the unstable unsaturated constituents takes place. The purified vapors pass from the catalytic chamber 1 through the line 6 to a reflux condenser 13 where a portion of the vapors are condensed, the remainder being passed to the main condenser 14 where condensation takes place after which separation of the condensate and fixed gases is accomplished in the receiving drum 15.

The condensate from the reflux condenser 13 flows through the line 16 to the T 17 where it is divided into two portions, one of which is directed through the line 18 to the upper portion of the fractionating tower 11, while the other portion is directed through the line 7 and the spraying device 8 to the bed of catalytic material 2 in the catalyst container 1. Thus a portion of the condensed purified hydrocarbons is supplied to the catalyst to act as a solvent of the polymers formed and adsorbed upon the surface of the catalyst. After passing downward through the bed of catalytic material, this portion of the condensate from the reflux condenser, which now contains dissolved polymers, collects in the lower portion of the container 1 and flows through the line 9 to the still 10 or to any desired point in the tower 11, the point of entry to the tower or to the still being controlled by means of the valves 19a, 19b, 19c, and 19d.

Although for the sake of convenience and clearness, the apparatus has been described in connection with a simple type of still adapted for pressure distillation, the process and apparatus may be operated in conjunction with any other cracking process, either vapor or liquid phase, yielding products of approximately the boiling range of gasoline which contain undesirable unsaturated compounds.

Obviously many modifications and variations of the invention, as hereinbefore set forth, may be made without departing from the spirit and scope thereof, and therefore, only such limitations should be imposed as are indicated in the appended claims.

I claim:

1. In apparatus for treating hydrocarbon oils, a still, a fractionating tower in vapor communication therewith, a reflux condenser, a catalyst container positioned between and in vapor communication with said fractionating tower and reflux condenser, a bed of pulverulent solid catalytic material positioned therein, means for supplying to the bed of catalytic material a portion of the condensate from the reflux condenser, means for supplying the remainder of the condensate from the reflux condenser to the upper portion of the fractionating tower, means for introducing into the fractionating tower the condensate from the catalyst chamber, means for returning the condensate from the lower portion of the fractionating tower to the still.

2. The process of treating cracked petroleum vapors, including vapors of constituents boiling within a gasoline boiling-point range, to remove undesirable gum-forming compounds therefrom, which comprises passing a stream of said vapors through a fractionating zone and therein progressively fractionating said vapors to obtain vapors of a desired end point, while condensing and separating higher-boiling constituents, subjecting the resultant vapors to contact with solid adsorbent catalytic material in a treating zone to effect polymerization of undesirable gum-forming constituents to products having boiling-points higher than that of the desired gasoline product, removing resultant polymer-containing oil from said treating zone and returning at least a portion thereof to a point in said fractionating zone as reflux, removing treated vapors from said treating zone, recovering therefrom a liquid condensate containing constituents boiling within a gasoline boiling-point range, and returning at least a portion of said condensate to a later point in said fractionation zone as reflux.

3. The process of treating cracked petroleum vapors, including vapors of constituents boiling within a gasoline boiling-point range, to remove undesirable gum-forming compounds therefrom, which comprises passing a stream of said vapors through a fractionating zone and therein progressively fractionating said vapors to obtain vapors of a desired end point, while condensing and separating higher-boiling constituents, subjecting the resultant vapors to contact with solid adsorbent catalytic material in a treating zone to effect polymerization of undesirable gum-forming constituents to products having boiling-points higher than that of the desired gasoline product, removing resultant polymer-containing oil from said treating zone and returning at least a portion thereof to a point in said fractionating zone as reflux, removing treated vapors from said treating zone, subjecting said treated vapors to partial condensation to recover therefrom a condensate comprising constituents boiling within a gasoline boiling-point range, returning at least a portion of said condensate to a later point in said fractionation zone as reflux, and finally condensing the remaining vapors to recover the desired treated product.

WILLIAM M. STRATFORD.